United States Patent [19]

Louthan

[11] Patent Number: 5,249,770
[45] Date of Patent: Oct. 5, 1993

[54] BEVERAGE CONTAINER HOLDER
[76] Inventor: Connie S. Louthan, P.O. Box 1862, Enid, Okla. 73702
[21] Appl. No.: 746,457
[22] Filed: Aug. 16, 1991

Related U.S. Application Data

[63] Continuation-in-part of Ser. No. 583,748, Sep. 17, 1990, Pat. No. 5,042,770.

[51] Int. Cl.⁵ .............................................. A47K 1/08
[52] U.S. Cl. ................... 248/311.2; 248/313; 248/205.2; 248/214; 248/231
[58] Field of Search .......... 248/311.2, 313, 310, 248/231, 690, 205.2, 214, 205.3; 24/306, 442

[56] References Cited
U.S. PATENT DOCUMENTS

| | | | |
|---|---|---|---|
| 3,212,743 | 10/1965 | Culver | 248/231 X |
| 3,224,644 | 12/1965 | Davis | 248/313 X |
| 3,253,786 | 5/1966 | Parmelee | 248/311.2 X |
| 4,310,110 | 1/1982 | Dexter | 24/306 |
| 4,779,837 | 10/1988 | Anderson | 248/311.2 |
| 4,890,571 | 1/1990 | Gaskill | 248/205.24 |
| 4,934,646 | 6/1990 | Doyle | 248/205.2 |
| 4,989,811 | 2/1991 | Millis et al. | 248/205.2 X |

Primary Examiner—Alvin C. Chin-Shue
Attorney, Agent, or Firm—Dunlap, Codding & Lee

[57] ABSTRACT

A holder connectable to a support for holding a beverage receptacle. The holder includes a body with a strap constructed of a flexible material connected to the body. The strap is removably connectable to the support for removably connecting the body to the support. The holder also includes a connector for connecting the holder to an automobile ashtray and means for connecting the holder in a cup opening of an automobile console.

1 Claim, 6 Drawing Sheets

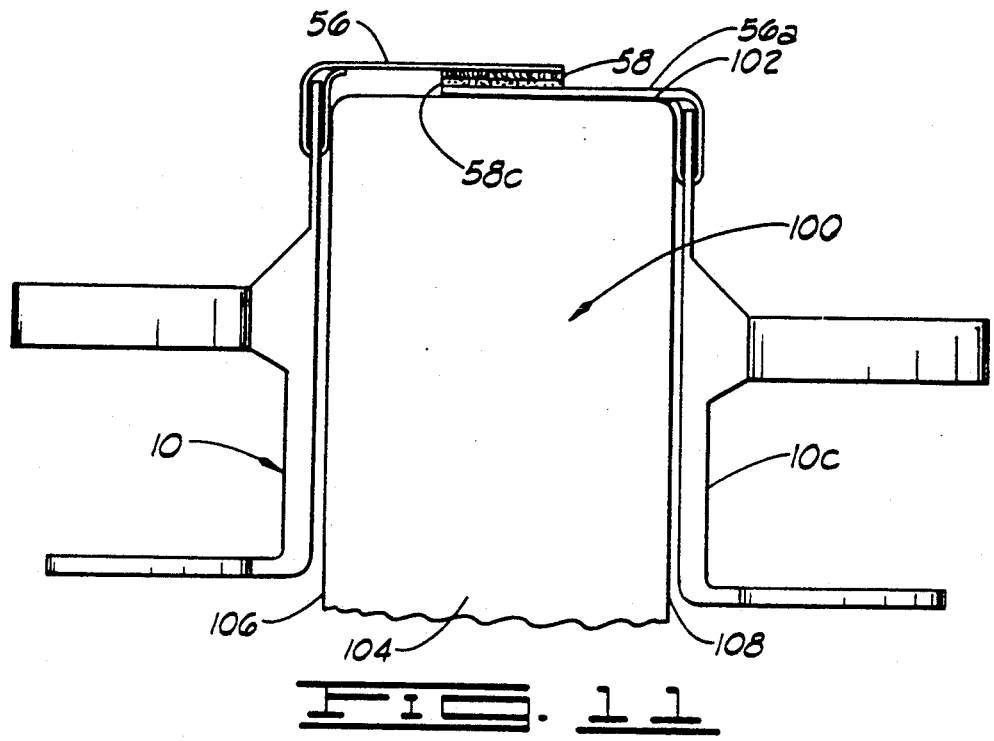
FIG. 11
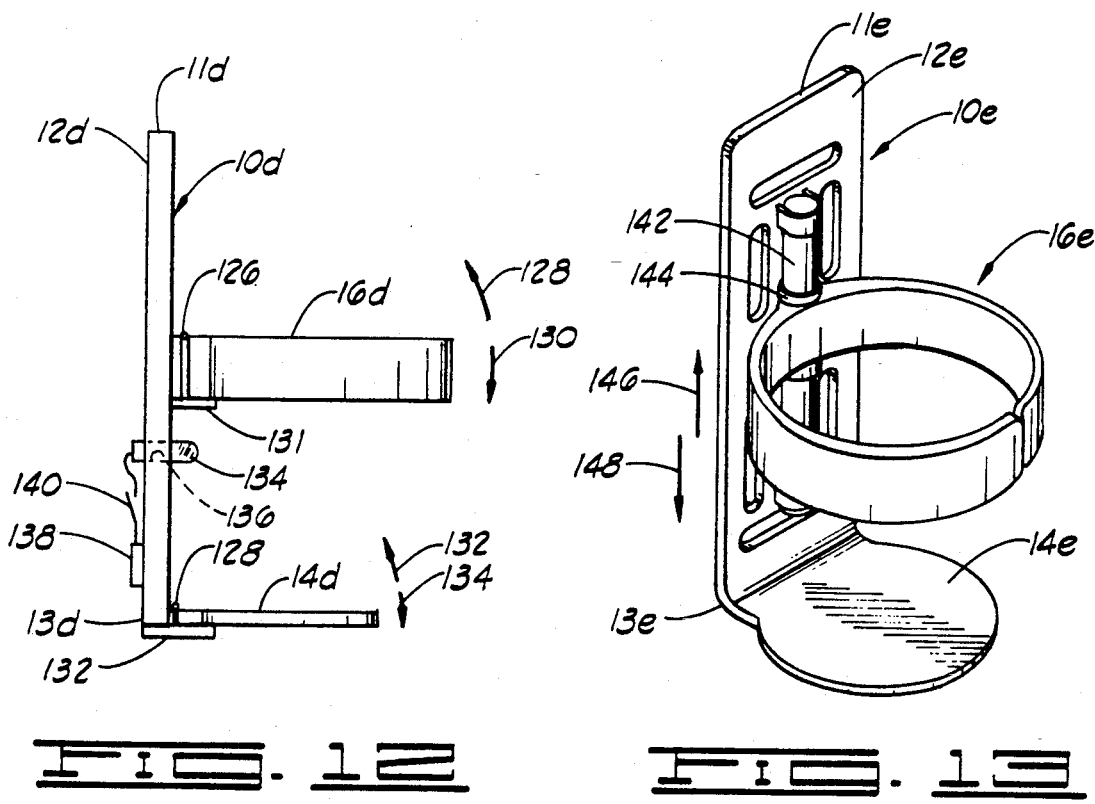
FIG. 12
FIG. 13

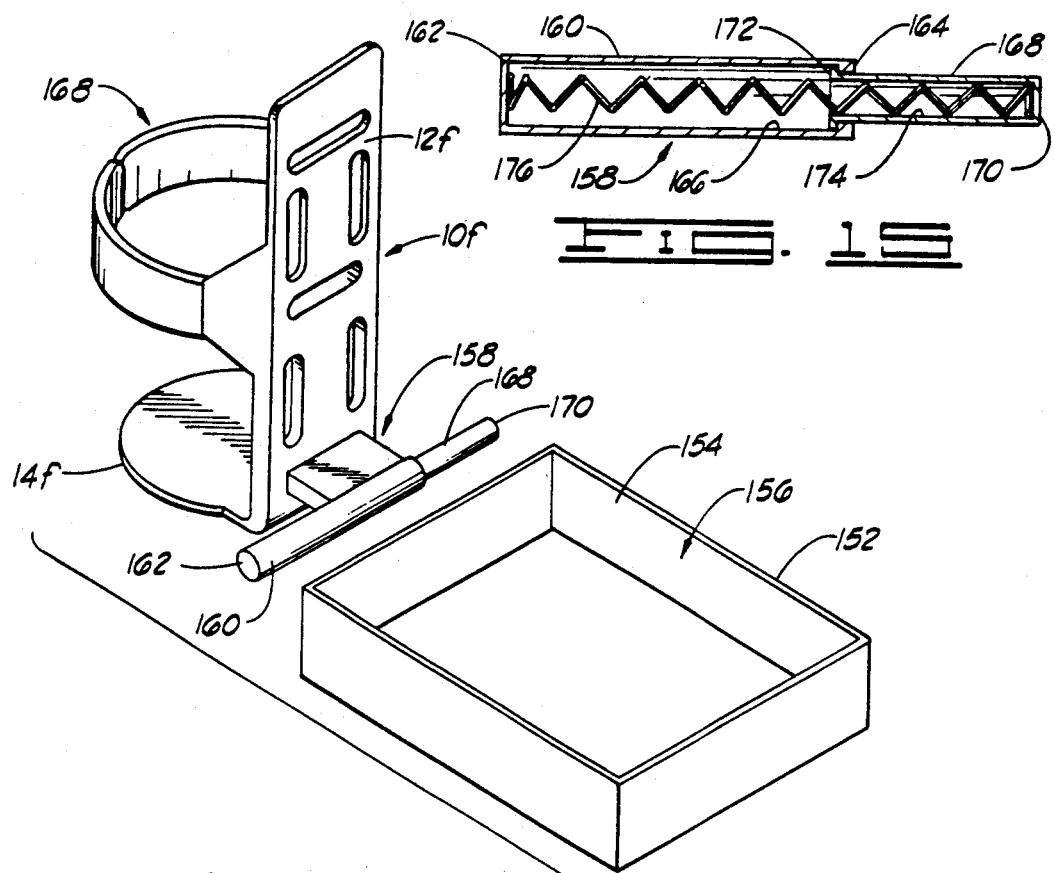
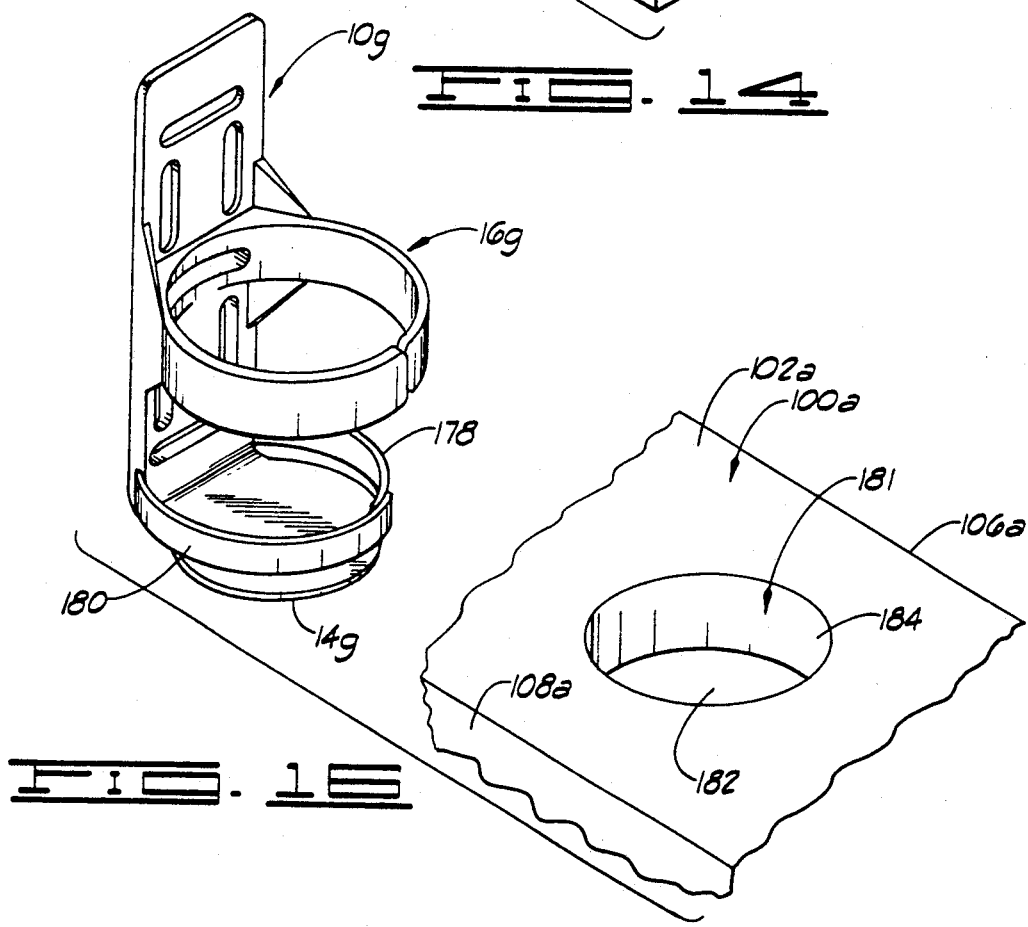

BEVERAGE CONTAINER HOLDER

RELATED REFERENCES

This application is a Continuation-in-part of U.S. Ser. No. 583,748, filed Sep. 17, 1990, U.S. Pat. No. 5,042,770 issued Aug. 27, 1991, entitled "BEVERAGE CONTAINER HOLDER". Applicant has received Notice of Allowance and Issue Fee Due.

FIELD OF THE INVENTION

The present invention relates generally to holders for holding a beverage receptacle having a body and a flexible strap connected to the body wherein the flexible strap is removably connectable to a support for supporting the body on the support.

BRIEF DESCRIPTION OF THE DRAWINGS

FIG. 11 is a front elevational view of a car console showing two holders constructed in accordance with the present invention connected to the car console.

FIG. 12 is a side elevational view of a modified holder constructed in accordance with the present invention wherein the arms and the base are foldable to a storage position and wherein the holder includes a light.

FIG. 13 is a perspective view of a modified holder constructed in accordance with the present invention wherein the arms are slidable in upwardly and downwardly directions.

FIG. 14 is a perspective view of a modified holder having connector means for connecting the holder to an ashtray of an automobile, a typical automobile ashtray being shown in FIG. 14 and the holder being shown in FIG. 14 prior to connection to the ashtray.

FIG. 15 is a sectional view of the connector means of the holder of FIG. 14.

FIG. 16 is a view of a modified holder constructed in accordance with the present invention having spring arms for connecting the holder in a cup opening of an automobile console, the automobile console being shown in FIG. 16 and the holder being shown in FIG. 16 prior to insertion in the cup opening in the automobile console.

DESCRIPTION OF THE PREFERRED EMBODIMENTS

Figure 2:
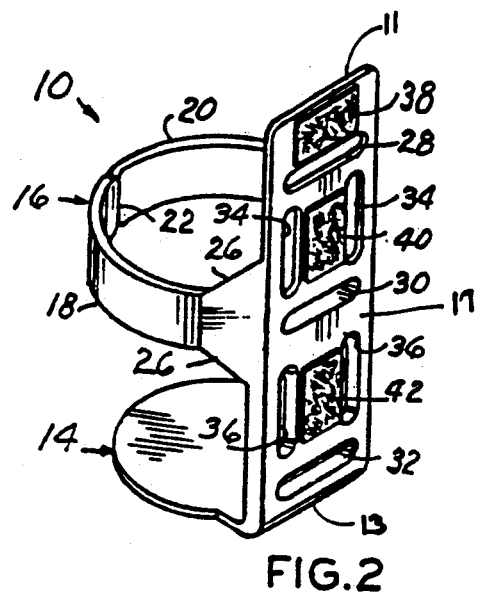
FIG. 2 is a perspective view from a different view point, including sections of hook-and-eye (Velcro ®) fastening material secured to the back surface of the holder.
Figure 1:
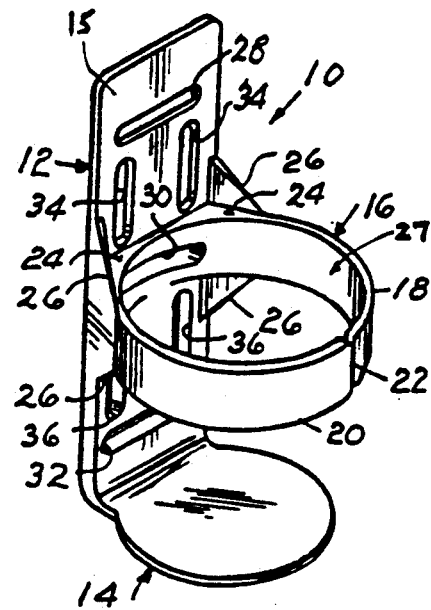
FIG. 1 is a perspective view of the holder, per se.

Referring to FIGS. 1 and 2, the reference numeral 10 indicates the holder as a whole comprising a longitudinally upright rigid rectangular body 12 having a part-circular base or support 14 projecting laterally from one end normal to the plane to the body and a pair of arm means 16. The body 12 has an upper end 11 (FIG. 2), a lower end 13 (FIG. 2), a front 15 (FIG. 1) and a back 17 (FIG. 2).

The arm means 16 comprises a pair of flexible band-like generally semicircular arms 18 and 20 rigidly secured at one end portion to the body and having their respective free end edges disposed in end abutting relation normal to the plane of the body 12 as indicated by the line 22. The fixed end portions of the arms are integrally joined rigidly to the front 15 of the body 12 and are braced by horizontal gussets 24 to strengthen their inner surface connection with the body.

Additionally, vertical gussets 26 rigidly interconnect the outer surface of the body 12 and the respective arms 18 and 20 to prevent separation of the arms 18 and 20 end portions connected with the body 12.

That end portion of the body 12 between its connection with the arms 18 and 20 and its connection with the circular base 14 is substantially thicker than the upper end portion of the body 12 above the position of the arm means 16 to provide sufficient rigidity for holding beverage containers as hereafter explained.

The arm means 16 is connected to the body 12 and extends a distance from the front 15 of the body 12. A receptacle opening 27 (FIG. 1) is formed through the arm means 16. The beverage receptacle is disposable through the receptacle opening 27 in the arm means 16.

The body 12 is further characterized by vertically spaced top, medial and lower end portion horizontal slots 28, 30 and 32 extending between respective side edges of the body. Additionally, the body 12 is provided with vertical and horizontally spaced pairs of vertical slots 34 and 36. The respective slot of the pair of slots 34 is disposed between the respective end portions of the horizontal slots 28 and 30, and similarly, the respective slot of the pair of slots 36 is disposed between the respective end portions of the horizontal slots 30 and 32.

The purpose of the slots 28-32 is to receive elongated strap-like fastening members securing the holder 10 to a variety of different shaped objects as desired as will presently be explained.

The back 17 of the body, opposite the arm means 16 and base 14, is provided with a plurality, three in the example shown, of one layer each of rectangular sections, 38, 40 and 42 of strap-like fastening fabric, such as the hook-and-loop fastener fabric presently marketed under the trademark Velcro ®.

The Velcro ® pad 38 is disposed between the top end of the body and the upper slot 28; the pad 40 between the two horizontal slots 28 and 30 and the pair of vertical slots 34; and, the pad 42 between the horizontal slots 30 and 32 and the pair of vertical slots 36.

Figure 4:
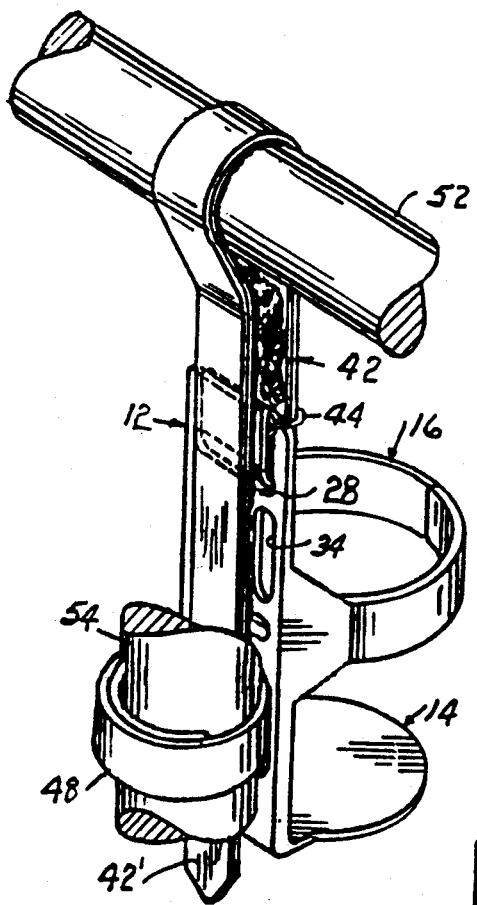
FIG. 4 is a perspective view, similar to FIG. 3, illustrating the holder attached to a horizontal and a vertical support.
Figure 3:
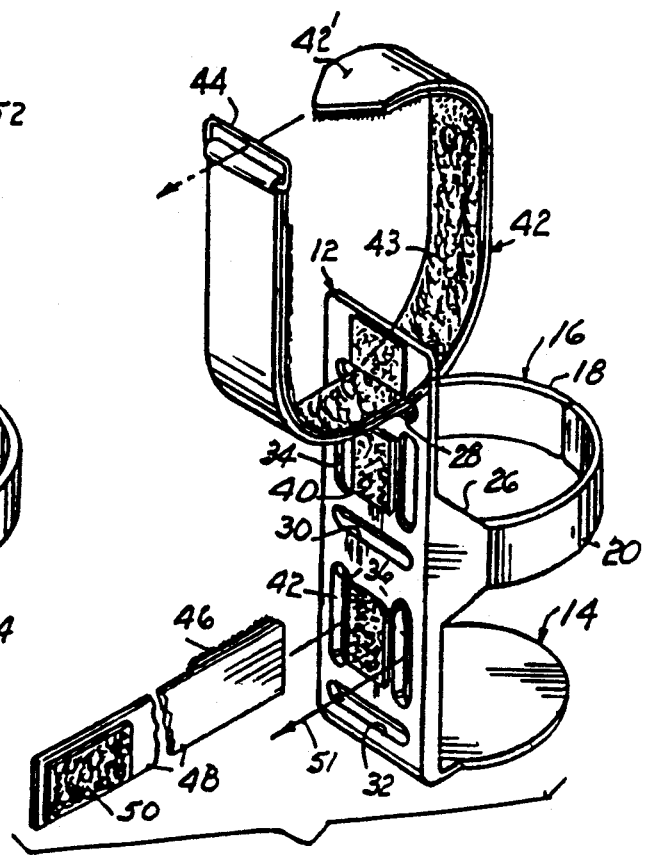
FIG. 3 is a perspective view, similar to FIG. 2, illustrating one manner of connecting strap fasteners with the holder.

Referring to FIGS. 3 and 4, an elongated strap 42 having Velcro ® material 43 on one surface is longitudinally inserted by one end portion 42' into the horizontal slot 28 from the rearward surface of the body 12. The opposite end portion of the strap 44 is secured to an endless loop 44 so that the free end portion 42' of the strap may be inserted through the loop 44 and the strap drawn or pulled taut to form a loop closely surrounding that end portion of the body between the slot 28 and the adjacent end of the body. The strap 42 is constructed of a flexible material (a cloth or elastomeric material) and the strap 42 is bendable without breaking or becoming set in a bent position. The strap 42 is removably connectable to the body 12 and the strap 42 is removably connectable to a support such as the rod 52 or the bar 54 or the cabinet counter top 62 for connecting the holder 10 (the body 12) to the support.

Similarly, an elongated length of strap material 48 having a section of Velcro ® material 46 on one surface at one of its ends and also provided with a similar length of Velcro ® material 50 on the opposite side and end portion of the strap 42 horizontally threaded through the pair of vertical slots 36 in the direction of the arrow 51 until respective end portions of the strap 48 project rearwardly from the body 12 substantially equidistant. The strap 48 also is constructed of a flexible material (cloth or elastomeric material, for example) and the strap 48 is bendable without breaking or becoming set in a bent position. The strap 48 is removably connectable to the body 12 and removably connectable to a support for cooperating to removably connect the holder 10 (body 12) to the support.

This arrangement of the straps 42 and 48 permits the holder 10 to be secured to a horizontal bar or rod 52, such as a hand rail, top bar on a wheel chair or any other like object and the strap end portion 42' extended longitudinally of the body 12 so that the Velcro ® material 43 engages both of the pads 40 and 42, as well as the Velcro ® material contacting itself adjacent the depending limit of the horizontal rod or bar 52.

Similarly, the strap 48 may be extended or wrapped in wrap-around-fashion, around a vertical bar or tube 54 so that when the respective Velcro ® sections 46 and 50 are overlapped upon each other, as viewed in FIG. 4, the depending end portion or base 14 of the holder is maintained against lateral movement in any direction.

Figure 6:
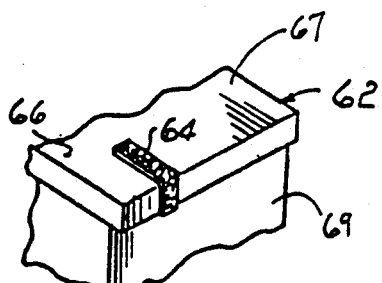
FIG. 6 is a fragmentary perspective view, illustrating the counter top prepared for receiving the holder of FIG. 5.
Figure 5:
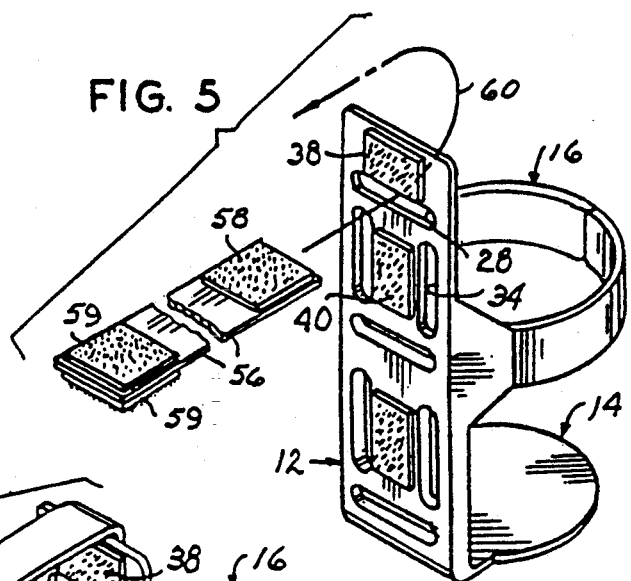
FIG. 5 is another perspective view of the holder, illustrating another manner of connecting a strap fastener to the holder for mounting it on a desk or counter top.
Figure 7:
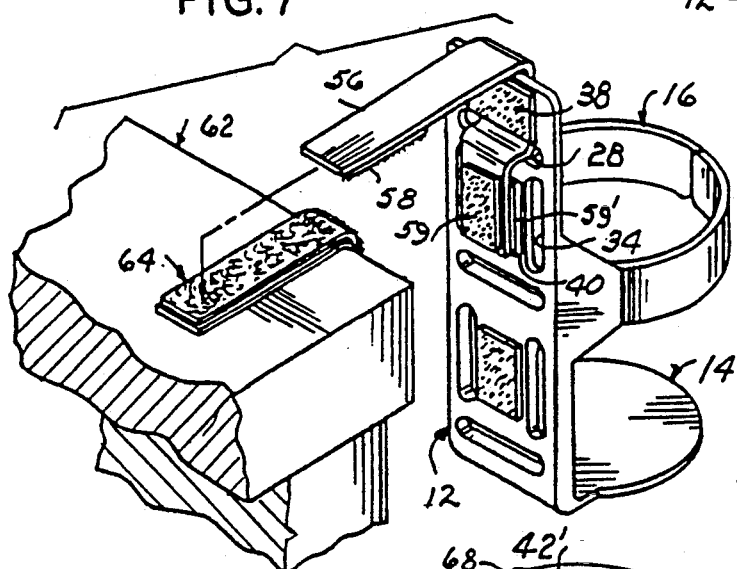
FIG. 7 is an exploded perspective view of the holder and the manner of connecting it to the desk or counter top of FIG. 6.

Referring to FIGS. 5, 6 and 7, a length of strap material 56 having Velcro ® pads 58 and 59 at its respective ends on the same surface and a paid 59 opposite the pad 59 is extended through the horizontal slot 28 in the direction of the arrow 60 for supporting the holder 10 on a cabinet or counter top or dashboard of an automobile (support), fragmentarily indicated at 62 (FIG. 7). The support 62 comprises a horizontally extending surface 67 (FIG. 6) and a vertically extending surface 69 (FIG. 6). A length of Velcro ® material 64 is previously adhered to the counter top 66 and extended over the vertical edge thereof as shown. This permits the leading end portion of the strap 56 (having the attached Velcro ® 58) to overlie and adhere to the Velcro ® material 64. The depending end portion of the strap 56 containing the other lengths of Velcro ® material 59 and 59' contacts the vertical edge portion of the counter mounted Velcro ® 64 and the body pad 40 to anchor the holder. The strap 56 also is constructed of a flexible material (such as cloth or elastomeric material for example) and the strap 56 is bendable without breaking or becoming set in a bent position.

Figure 8:
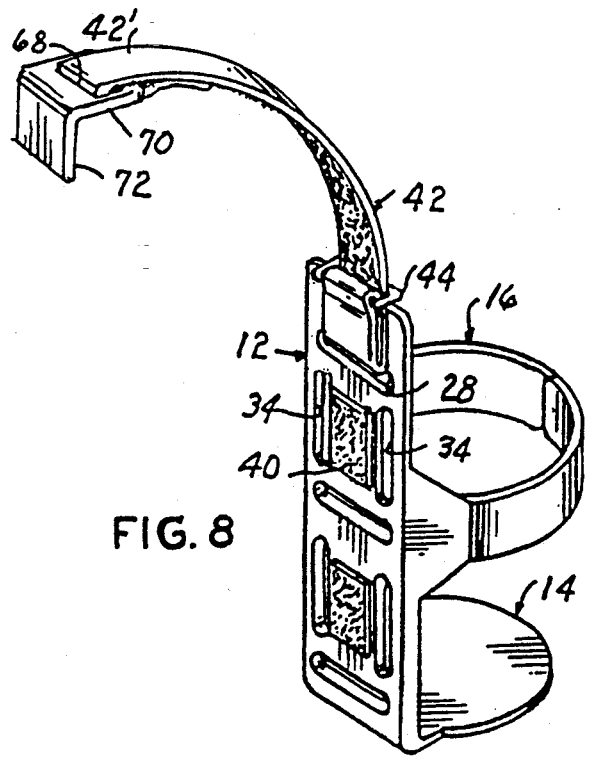
FIG. 8 is a perspective view, illustrating the manner of connecting a strap fastener to the holder to be supported from the window opening of an automotive vehicle door.

Referring to FIG. 8, the strap member 42 may be similarly inserted through the slot 28 in the manner shown by FIG. 3 and the free end portion 42' of the strap secured with a loop 68 in one leg 70 of the angle member having its other leg 72 normal to the leg 70.

The angle member end portion 72 is cooperatively received within a vehicle door window slot adjacent the window glass thereof, not shown, wherein the Velcro ® material 43 extending downwardly along the inner surface of the door securedly engages fabric of the door surface to maintain the holder 10 in upright drink nonspilling relation.

Obviously, other Velcro ® equipped straps may be inserted through the other horizontal slots 30 and 32 or the top pair of vertical slots 34 in a similar manner to that described thereinabove for connecting the holder 10 to a variety of other objects in accordance with the configuration of the structural components. For example, one of the holders and its strap 42, as illustrated and described hereinabove for FIG. 3, may be used with an identical companion member in which the straps 42 may be single strap or dual straps overlying a console, not shown, between passengers in the forward seats of an automobile for holding drink containers on either side of the console.

EMBODIMENT OF FIG. 9

Figure 9:
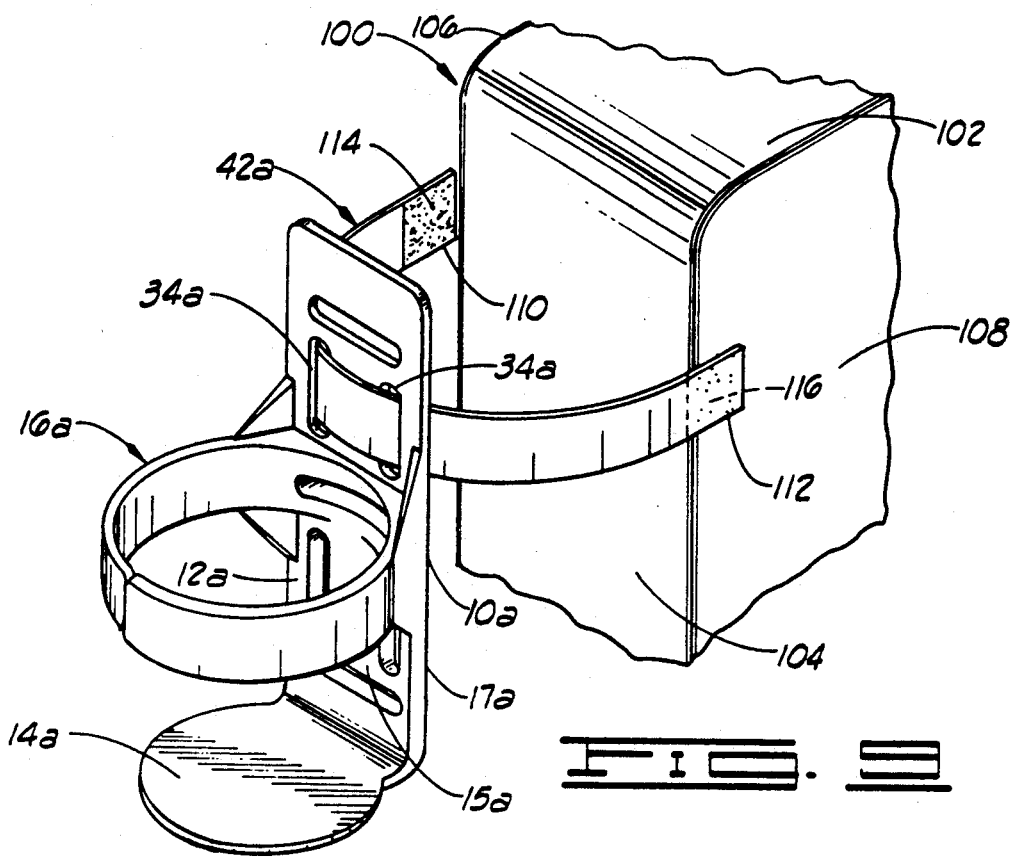
FIG. 9 is a partial perspective view showing a portion of the arm of an arm chair or a front portion of a car console and showing a holder constructed in accordance with the present invention adapted to be connected to the arm of the arm chair or the car console.

Shown in FIG. 9 and designated by the reference numeral 100 is an elevational view of a typical console of an automobile. The console 100 has a horizontally extending surface 102, a vertically extending surface 104, a first side vertically extending surface 106 and a second side vertically extending surface 108. The reference numeral 100 is shown in FIG. 9 also represents the arm of a chair.

The holder 10a shown in FIG. 9 is constructed like the holders 10 described before, except the holder 10a, except it includes a modified strap 42a. The strap 42a is disposed through the slots 34a to removably connect the strap 42a to the holder 10a. The strap 42a has a first end 110 and a second end 112 and a portion of the strap 42a extends a distance from the holder 10a terminating with the first end 110 and another portion of the strap 42a extends a distance from the holder 10a terminating with the second end 112. An adhesive strip 114 is disposed on a portion of the strap 42a near the first end 110 and another adhesive strip 116 is disposed on the portion of the strap 42a near the second end 112.

In operation, the holder 10a is positioned near the console 100 with the back 17a of the holder 10a being disposed adjacent the vertically extending surface 104 of the console 100. In this position, a portion of the strap 42a is extended along the first side vertically extending surface 106 and the adhesive strip 114 is adhesively connected to the first side vertically extending surface 106 to adhesively connect the first end 110 of the strap 42a to the first side vertically extending surface 106 of the console 100. Another portion of the strap 42a is extended along a portion of the second side vertically extending surface 108 to a position wherein the adhesive strip 116 is disposed adjacent the second side vertically extending surface 108 to adhesively connect the second end 112 of the strap 42a to the second side vertically extending surface 108.

EMBODIMENT OF FIG. 10

Figure 10:
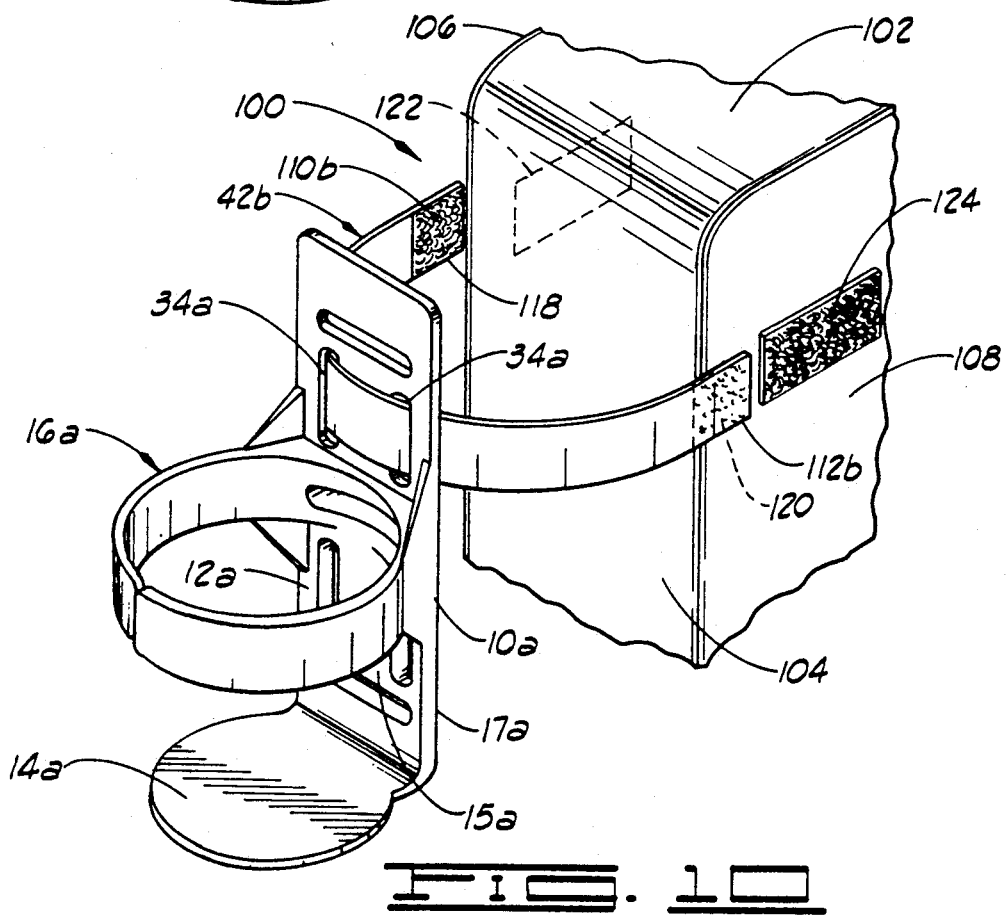
FIG. 10 is a view similar to FIG. 9 but showing Velcro ® strips for connecting the holder to the arm of a chair or the car console.

Shown in FIG. 10 is the console 100 and the holder 10a with another modified strap 42b connected thereto. The strap 42b is constructed exactly like the strap 42a, except the strap 42b does not include adhesive strips like the adhesive strips 114 and 116. Rather, the strap 42b includes a hook and loop means 118 disposed near the first end 110b and a hook and loop means 120 disposed near the second end 112b of the strap 42b. A hook and loop means 122 is connected to the first side vertically extending surface 106 and a hook and loop means 124 is connected to the second side vertically extending surface 108 of the console 100.

The holder 10a is positioned adjacent the vertically extending surface 104 of the console 100 in a manner like that described before in connection with FIG. 9. The hook and loop means 118 on the strap 42b is connected to the hook and loop means 122 on the first side vertically extending surface 106 in the console 100 and the hook and loop means 120 and the strap 42b is connected to the hook and loop means 124 on the second side vertically extending surface 108 of the console 100 to removably connect the holder 10a to the console 100.

EMBODIMENT OF FIG. 11

Shown in FIG. 11 is the console 100 having two holders 10 and 10c connected thereto. The holders 10 and 10c are identical in construction and each of the holders 10 and 10c are constructed exactly like the holder 10 shown in FIG. 7, except each holder 10c has a modified strap connected thereto. The strap 56 has a first end which is removably connected to the holder 10 in the manner described before in connection with FIG. 7 and includes the Velcro ® strip 58 on a second end of the strap 56. A first end of the strap 56a is connected to the holder 10c in a manner like that described before with respect to FIG. 7 and a Velcro ® strip 58c is connected to the second end of the strap 56a, the Velcro ® strip 58c being connected to an opposite surface of the strap 56a as compared to the Velcro ® strip 58 on the strap 56.

In operation, the holder 10c is positioned adjacent the first side vertically extending surface 106 and the holder 10c is positioned adjacent the second side vertically extending surface 108. The strap 56 is extended a distance over the horizontally extending surface 102 of the console 100 and the strap 56a is extended a distance over the horizontally extending surface 102 of the console 100. In this position, the hook and loop means or Velcro ® strip 58 is removably connected to the hook and loop means or Velcro ® strip 58c thereby connecting the holder 10 to the holder 10c and securing the holders 10 and 10c in a position removably connected to the console 100.

It should be noted that, the straps 56 and 56a each could include an adhesive strip in lieu of the hook and loop means 58 and 58c for adhesively connecting each of the straps 56 and 56a to the horizontally extending surface 102 of the console 100 for independently connecting the holders 10 and 10c to the console 100. In this embodiment, one could use either the holder 10 or the holder 10c rather than using both of the holders 10 and 10c.

EMBODIMENT OF FIG. 12

Shown in FIG. 12 is a modified holder 10d which includes a modified arm means 16d and a modified base 14d. The holder 10d and the arm means 16d and the base 14d are constructed exactly like the holders 10 described in detail before, except the arm means 16d is pivotally or hingedly connected to the body 12d by way of a hinge means 126 whereby the arm means 16d is pivotal in a first direction 128 and in a second direction 130. The base 14d is constructed exactly like the base 14 described in detail before, except the base 14d is hingedly connected to the body 12d by way of a hinge means 128 whereby the base 14d is pivotally movable in a first direction 132 and in an opposite second direction 134.

A stop 131 is connected to the body 12d and positioned under the arm means 16d for limiting the movement of the arm means 16d in the second direction 130. A stop 132 is connected to the body 12d and positioned under the base 14d for limiting the movement of the base 14d in the second direction 134.

A light 134 is connected to the body 12d, the light 134 being disposed through an opening 136 in the body 10d. The light 134 is connected to a battery 138 by way of a switch 140.

In operation, the individual moves the arm means 16d and the base 14d in the respective directions 130 and 134 to a position wherein the arm means 16d engages the stop 134 and the base 14d engages the stop 132 to position the arm means 16d and the base 14d in an operating position. In this position, the holder 10d is used in a manner like that described before with respect to the other holders. After using the holder 10d, the user can be move the arm means 16d and the base 14d in the respective directions 128 and 132 to a position wherein the arm means 16d in the base 14d are disposed adjacent the body 12 in a storage position.

The operator also can position the switch 140 in the closed position as opposed to the opened position shown in FIG. 12 to illuminate the light 134 to light the area generally around the arm means 16d and the base 14d to facilitate the user inserting the beverage receptacle in the arm means 16d.

EMBODIMENT OF FIG. 13

Shown in FIG. 13 is another modified holder 10e which is constructed exactly like the holders described before, except the holder 10e includes a slide bar 142 which is connected to the body 12 and extends generally between the upper end 11e and the lower end 13e of the body 12. A clip 144 is movably connected to the slide bar 142 so that the clip 144 may be moved in an upwardly direction 146 or in a downwardly direction 148. The arm means 16 is connected to the clip 144. A set screw (not shown) is disposed through a portion of the clip 144 and is engagable with the slide bar 142.

In operation, the position of the arm means 16 maybe adjusted by moving the arm means and the clip 144 connected thereto in the upwardly direction 146 and the downwardly direction 148 on the slide bar 142. When the arm means 16 has been positioned in the proper position, the arm means 16 is secured in this position by moving the set screw to engage a portion of the slide bar 142.

EMBODIMENT OF FIG. 14 AND 15

Shown in FIG. 14 is an ashtray 152 which is intended to represent a typical automobile ashtray which is removably disposable in a portion of an automobile. The ashtray 152 has side walls 154 and an ashtray opening 156.

Also shown in FIG. 14 is a modified holder 10f which is constructed exactly like the holders described before, except the holder 10f includes a connector 158 for removably connecting the holder 10f to the ashtray 152.

As shown more clearly in FIG. 15, the connector 158 more particularly comprises a first tube 160. The first tube 160 has a first end 162 and a second end 164. A tube opening 166 is formed through the second end 164 of the first tube 160 and the tube opening 166 extends a distance through the first tube 160.

The connector 158 also includes a second tube 168. The second tube 168 has a first end 170 and a second end 172. A tube opening 174 is formed through the second end 172 and the tube opening 174 extends a distance through the second tube 168. The second end 164 of the first tube 160 is slidingly disposed in the tube opening 174 of the second tube 168 so that the first tube 160 is telescopingly disposed in the second tube 168.

A spring 176 is disposed in the tube openings 166 and 174 of the first and the second tubes 160 and one 168. The spring 176 biases the first end 162 of the first tube 160 in a direction generally away from the first end 170 of the second tube 168 for extending the length of the first and the second tubes 160 and 162 generally between the first ends 162 and 170.

In operation, an individual pushes the first end of 162 of the first tube 160 and the first end 170 of the second tube 168 generally toward each other thereby compressing the spring 176 and decreasing the length extending between the first ends 162 and 170 of the first and the second tubes 160 and 168. In this compressed position, the holder 10f with the connector 158 is disposed in the ashtray opening 156. After disposing the holder 10f in the ashtray opening 156, the user then releases the first and the second tubes 160 and 168 whereby the spring 176 biases the first end 162 of the first tube 160 into engagement with a portion of the side walls 154 and biases the first end 178 and the second tube 168 into engagement with a portion of the side walls 154. The engagement between the first ends 160 and 170 of the first and the second tubes 160 and 168 biased by the spring 176 holds the holder 10f removably secured in the ashtray 152. When it is desired to remove the holder 10f from the ashtray 152, the user again compresses the spring 176 to release the engagement between the first and the second tubes 160 and 168 and the side walls 154.

EMBODIMENT OF FIG. 16

Shown in FIG. 16 is a holder 10g constructed exactly like the holders described before, except the holder 10g includes a pair of spring arms 178 and 180. One end of each of the spring arms 178 and 180 is connected to the body 12 and each of the spring arms 178 and 180 extends a distance from the front 15 of the body 12. The spring arms 178 and 180 have a compressed position wherein the spring arms 178 and 180 are moved in a direction generally toward each other and a released position wherein the spring arms 178 and 180 are springly moved in a direction generally away from each other.

Also shown in FIG. 16 is a console 100a which is constructed exactly like the console 100 described before, except the console 100a includes a cup opening 181 extending through the horizontally extending surface 102 terminating with a cup opening base 182 and forming a side wall 184 in the console 100a.

In the compressed position of the spring arms 178 and 180, the holder 10g is disposable or insertable into the cup opening 181 insertable into the cup opening 181 to a position wherein the base 14 is disposed on the cup opening base 182. In this position, the spring arms 178 and 180 are released and automatically moved to the released position wherein the spring arms 178 and 180 each engage a portion of the side wall 184 in the cup opening 181 for securing and removably holding the holder 10g in the cup opening 181.

EMBODIMENT OF FIG. 17

Figure 17:
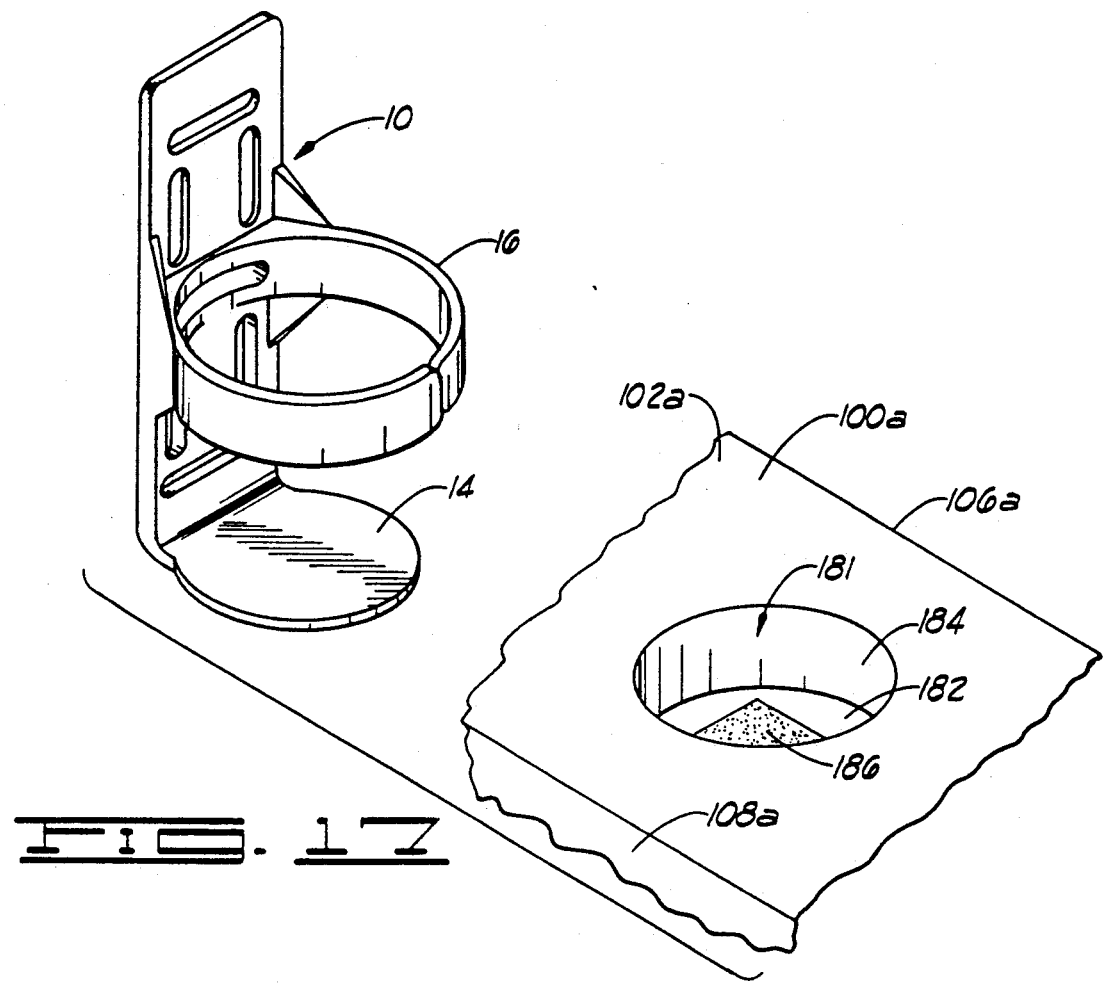
FIG. 17 is a view similar to FIG. 16 showing a modified cup holder and a portion of a car console with modified means for connecting the holder in the cup opening of the automobile console.

Shown in FIG. 17 is the holder 10 which is constructed exactly like the holder 10 described before. Also shown in FIG. 17 is the console 100a. The console 100a includes a strip of adhesive 186 on the cup opening base 182.

In operation, the user disposes or inserts the holder 10 into the cup opening 181 to a position wherein the base 14 is disposed on the adhesive strip 186 for adhesively connecting the holder 10 in the cup opening 181.

Alternatively, a hook and loop strip can be connected to the bottom of the base 14 and another hook and loop strip can be connected to the cup opening base 182. In this embodiment, the holder 10 is disposed in the cup opening 181 to a position wherein the hook and loop strip on the bottom of the base 14 is removably connected to the hook and loop strip on the cup opening base 182 for removably connecting the holder 10 to the console 100a.

EMBODIMENT OF FIG. 18

Figures 18, 19:
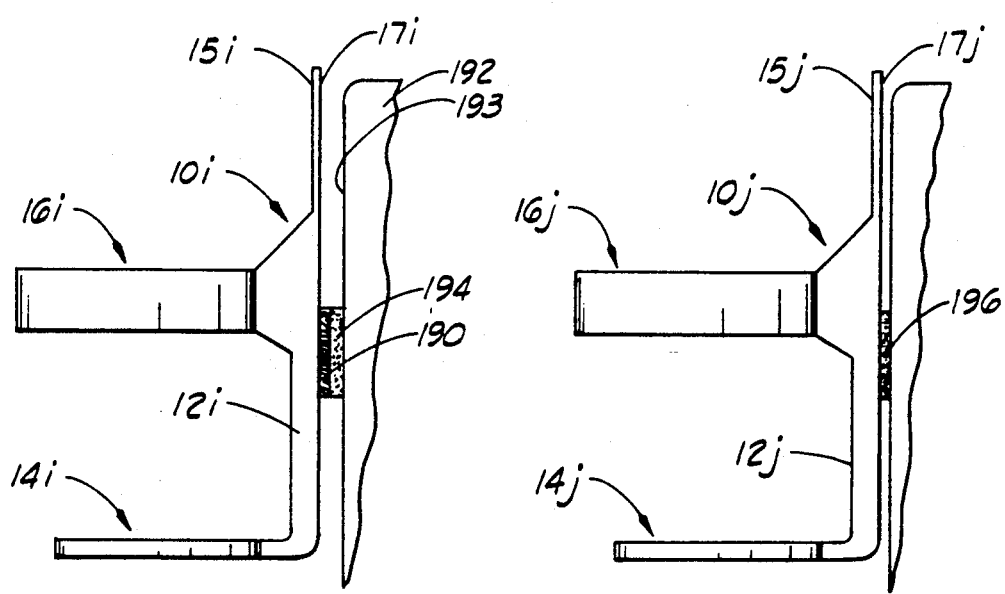
FIG. 18 is a view of a modified holder with hook and loop means for connecting the holder to a vertical surface/such as a wall.
FIG. 19 is a similar to FIG. 18 but showing adhesive means on the holder for connecting the holder to a vertical surface such as a wall.

Shown in FIG. 18 is a holder 10i which is constructed exactly like the holders described in detail before, except the holder 10i includes a hook and loop strip 190 on the back 17 of the body 12. Also shown in FIG. 18 is a vertically extending structure 192 having a vertically extending surface 193. The vertically extending structure 192 may be a wall.

A hook and loop strip 194 is connected to the vertically extending surface 193.

In operation, the holder 10i is positioned adjacent the vertically extending surface in a position wherein the hook and loop strip 190 on the holder 10i is connected to the hook and loop strip 194 on the vertically extending surface 193 for removably connecting the holder 10i to the vertically extending structure 192.

EMBODIMENT OF FIG. 19

Shown in FIG. 19 is a holder 10j which is constructed exactly like the holder 10i described before, except the holder 10j does not include the hook and loop strip rather than the holder 10j includes an adhesive 196 on the back 17; of the body 12. In this embodiment, the holder 10j is positioned adjacent the vertically extending surface 193. The adhesive 196 adhesively connects the holder 10j, to the vertically extending surface 193.

It should be noted that the adhesive strip 193 could be on the vertically extending surface 193, rather than the holder 10j.

Changes may be made in the construction and the operation of the various components, elements and assemblies described herein without departing from the spirit and scope of the invention as defined in the following claims.

What is claimed is:

1. A holder connected to a vertically extending structure and a horizontally extending structure for holding a beverage receptacle, comprising:

a body having a front and a back;

arms means connected to the body and extending a distance from the front of the body, a receptacle opening being formed through the arm means for receiving the beverage receptacle, the beverage receptacle being disposed through the receptacle opening in the arm means;

a strap constructed of a flexible material and being bendable without breaking or becoming set in a bent position being connected to the body, the strap being removably connected to the support for removably connecting the body to the support whereby the body is supported on the support, the strap extending from the holder and being connected to the horizontally extending structure; and a second strap connected to the holder and extending a distance from the holder, the second strap being secured about the vertically extending structure with the body being disposed adjacent the vertically extending structure.

* * * * *